United States Patent Office 3,491,075
Patented Jan. 20, 1970

3,491,075
CROSSLINKING OF POLYMERS HAVING DEPENDENT ESTER GROUPS WITH POLYVALENT METAL ALKOXIDES
Henri G. G. Dekking, Costa Mesa, Calif., assignor to Union Oil Company of California, Los Angeles, Calif., a corporation of California
No Drawing. Filed Oct. 13, 1965, Ser. No. 495,679
Int. Cl. C08f 27/04
U.S. Cl. 260—87.3                                    7 Claims

ABSTRACT OF THE DISCLOSURE

Polymers of ester monomers which have ester groups dependent from the polymer backbone are crosslinked by admixing the polymer with a polyvalent metal alkoxide at a temperature between 75° and 225° C. The temperature and admixing conditions are chosen to avoid carbon-to-carbon bond rupture and thereby avoid any degradation of polymer. The admixing is performed with suitable solid-liquid mixing techniques such as a roller mill and the admixture is milled for a few seconds to about 10 minutes to insure complete reaction and crosslinking of the polymers. The crosslinking reaction occurs by ester interchange between the metal alkoxide and the ester groups dependent on the polymer chain to form a crosslinked polymer having improved high temperature properties.

Description of the invention

This invention relates to a method for the crosslinking of polymers of ester monomers and in particular homopolymers and copolymers of monomers comprising esters of saturated aliphatic acids and ethylenically unsaturated alcohols as well as copolymers of these ester monomers with other ethylenically unsaturated monomers.

The homopolymers of the aforementioned ester monomers such as polyvinyl acetate are relatively flexible materials having softening points at ambient temperatures so that the polymers are not suited for use as molded products. Various methods have been proposed to provide suitable molding powders, e.g., use of fillers or crosslinking of the polymers. The fillers, however, decrease the strength of the polymer and the crosslinking techniques used heretofore have generally involved the scission of carbon-to-carbon bonds in the polymer to generate free radical fragments which are crosslinked by a suitable agent. The inherent degradation of the polymer to form free radical fragments offsets the improvement in the properties of the polymer that would be expected upon crosslinking.

It is an object of this invention to provide an improved, crosslinked polymer from ester monomers.

It is an object of this invention to provide a method for the crosslinking of polymers of ester monomers.

It is a further object of this invention to provide a crosslinking method which does not degrade the polymer by carbon-to-carbon bond rupture.

It is a further object of this invention to provide a relatively simple and direct method for the crosslinking of polymers of ester monomers.

Other and related objects will be apparent from the following description of the invention.

I have found that polymers of ester monomers of a saturated aliphatic acid and an ethylenically unsaturated alcohol can be crosslinked under conditions which are insufficient to sever carbon-to-carbon bonds by admixing with the polymer a polyvalent metal alkoxide at a temperature from about 75° to about 300° C.; preferably from about 100° to 200° C. Under these conditions transesterification occurs with the polyvalent metal forming an alkoxy link between the polymer chains. The reaction also yields a byproduct ester by combination of the alkoxy group from the polyvalent metal alkoxide with the carboxylic group of the ester monomer.

It is further within the scope of my invention to conduct this blending and reaction under conditions of temperautre and pressure such that the aforementioned byproduct ester is vaporized and removed from the polymer. The use of subatmospheric pressures facilitates the removal of this byprdouct ester; however if desired, superatmospheric pressures can be employed. The polymer can also be sparged with a suitable inert gas to facilitate the removal of this byproduct ester.

The polymer that can be crosslinked in accordance with my invention can be any polymer or copolymer of an ester monomer of a saturated aliphatic acid and an ethylenically unsaturated alcohol, e.g., vinyl esters such as vinyl acetate, vinyl propionate, vinyl isopropionate, vinyl butyrate, vinyl valerate, etc.; allyl esters such as allyl acetate, allyl propionate, allyl butyrate, etc.; 3-butenyl acetate, 3-butenyl oleate, 4-pentenyl butyrate, etc. The homo- or copolymers of these unsaturated esters can be crosslinked as well as the copolymers of any of the aforementioned unsaturated esters with other ethylenically unsaturated monomers such as the alkenes, e.g., ethylene, propylene, butene, isobutylene, butadiene, pentene-1, isopentene, isoprene, and higher molecular weight alpha olefins, e.g., 1-octene, 1-nonene, 1-decene, 1-dodecene, etc. Copolymers of any of the aforementioned unsaturated esters with other vinyl monomers can also be crosslinked in accordance with my invention, such as copolymers formed with styrene, chlorostyrene, methylstyrene, vinyl fluoride, chloroprene, vinyl chloride, vinylidene chloride, etc.

Other ethylenically unsaturated and polymerizable monomers that can be copolymerized with any of the aforementioned ester monomers include the acrylics such as acrylic acid, methacrylic acid, acrylamide, methacrylamide, acrylonitrile, methacrylonitrile, methyl methacrylate, methyl acrylate, ethyl acrylate, ethyl methacrylate, propyl acrylate, isopropyl methacrylate, isobutyl acrylate, amyl methacrylate, hexyl methacrylate, lauryl methacrylate, stearyl methacrylate, etc. Copolymers of the aforementioned ester monomers and vinyl ethers such as ethyl vinyl ether, isopropyl vinyl ether, butyl vinyl ether, etc., can also be crosslinked by my invention.

The polyvalent metal alkoxide useful in accordance with my invention has the following structure:

$$M(OR)_n$$

wherein M is a polyvalent metal of Groups II, III, IV, V, VII and VIII;
R is an alkyl group having from 1 to about 20 carbons; and
n is a whole number of 2 to 5.

Examples of polyvalent metals of the aforementioned groups which form alkoxides and which therefore are useful in my invention are: beryllium, magnesium, calcium, barium, zinc, cadmium, mercury, boron, aluminum, thallium, silicon, germanium, tin, lead, titanium, zirconium, hafnium, antimony, bismuth, vanadium, niobium, tantalum, selenium, tellurium, chromium, molybdenum, tungsten, manganese, iron, cobalt, nicketl, etc. Of the aforementioned, alkoxides of magnesium, aluminum, silicon, titanium, zirconium, antimony and vanadium are presently commercially available and hence are preferred. Most preferred are those which are soluble in organic or polar solvents such as the aluminum, silicon, titanium, zirconium, antimony and vanadium alkoxides.

Although the invention is operative with high molecular weight alkoxy groups as previously mentioned, one embodiment of my invention comprises the removal by vaporization of the byproduct ester formed in the transesterification crosslinking. Examples of suitable compounds useful in accordance with my invention therefore are magnesium methoxide, titanium isopropoxide, vanadium methoxide, chromium decoxide, aluminum isopropoxide, aluminum decoxide, silicon sec-butoxide, ethyl silicate, zirconium eicocoxide, antimony dodecoxide, cobalt isopropoxide, bismuth butoxide, tantalum ethoxide, etc. To facilitate the vaporization of the ester, I prefer to employ alkoxides of low molecular weight alkoxy groups, particularly those having from about 1 to 5 carbons.

The polymer and the polyvalent metal alkoxide are admixed under conditions which are insufficient to cause the scission of any carbon-to-carbon bonds. In general, the reaction is performed at temperatures greater than about 75° C. and preferably at temperatures above the softening point of the particular polymer. Preferably, temperatures in excess of about 225° C. are avoided to insure that the carbon-to-carbon bonds will not be broken by this treatment. Most preferably, the temperature of the blending is from about 90° to about 150° C. The polymer and the polyvalent metal alkoxide are blended to insure intimate admixture of the metal alkoxide with the polymer. This can be achieved by blending of the polymer and addition of the polyvalent metal alkoxide thereto with suitable solid-liquid mixing techniques such as roller mills, kneaders, pug mills, ribbon mixers, etc. The reaction is rapid under the aforementioned conditions and reaction periods from about a few seconds to about 10 minutes are sufficient to insure complete reaction. To avoid any possible rupture of carbon-to-carbon bonds, I prefer to minimize the mechanical working of the polymer and employ reaction periods of about 10 minutes or less.

The polyvalent metal alkoxide is employed in an amount from about 0.5 to about 5 weight percent of the polymer and preferably from about 1 to about 2 weight percent. I prefer to employ the lower molecular weight alkoxy compounds since the byproduct ester produced in the reaction is more readily recovered or separated by vaporization from the crosslinked polymer. When it is not necessary to separate these materials from the polymer, it is of course apparent that higher molecular weight alkoxy-containing compounds can be used, including any of the aforementioned high molecular weight materials. The higher molecular weight materials are generally solid at the mixing temperature and to facilitate their admixing with the polymer they can be dissolved in a suitable solvent which is inert to the polymer and the alkoxide at the aforementioned reaction conditions. Preferably the solvent is volatile so that it can be readily separated from the crosslinked polymer, e.g., solvents having atmospheric boiling points below about 149° C. are preferred. The solvent preferably is also a solvent for the alkoxide and for the polymer, i.e., a common solvent, so that it aids the intimate mixing of these reactants. The polymers and alkoxides are generally soluble in hydrocarbons and alkanols and therefore examples of preferred solvents are alkanols and aliphatic, alicyclic and aromatic hydrocarbons, e.g., pentane, octane, naphtha, kerosene, benzene, cyclohexane, toluene, xylene, methanol, ethanol, isopropanol, butanol, pentanol, etc.

The following examples will serve to illustrate the practice of my invention and demonstrate the results obtainable thereby.

Example 1

The reactants were admixed on a conventional rubber mill comprising two rotating and heated rolls approximately 8 inches in diameter with a variable spacing between the rolls which was adjusted to approximately 1/16 inch. The speed of rotation of the rolls was about 27 r.p.m. for one roll and about 22 r.p.m. for the other roll. The rolls were heated to 154° C. and 200 grams of Elvax-220, a copolymer of vinyl acetate and ethylene containing 28 weight percent vinyl acetate was added thereto. After the copolymer had been distributed on the mill, 7 grams of aluminum tridecylate was added and the milling continued for about 10 minutes. The resultant product had a rubber consistency with a higher softening point than the original copolymer, evidencing crosslinking of the copolymer during the milling operation. A similar result was obtained when the experiment was repeated with the addition of 7.2 grams of aluminum 2-ethyl hexoxide.

Example 2

The rubber mill was heated to 149° C. and 50 grams of polyvinyl acetate was distributed on the rollers and 3 grams of molten aluminum isopropoxide was slowly added to the material. The mixture was mileld on the mill for about 5 minutes and then removed. A disc approximately 2 inches in diameter and 1/8 inch thick was molded from the material. The disc was placed in a beaker of water and slowly heated therein while periodically determining the softening point of the polymer. Under these conditions the softening point of the untreated polymer is 21° C. The product of the milling with the aluminum triisopropoxide, however, did not reach a softening point until 35° C.

The experiment was repeated with the addition of 1 gram aluminum 2-ethyl hexoxide in lieu of the aluminum isopropoxide previously employed. A similar high softening point polymer was obtained by this experiment.

Example 3

A reaction flask was charged with 425 grams of a heavy mineral oil which was heated to 130° C. Fifty grams of a copolymer of ethylene and vinyl acetate containing 28 weight percent vinyl acetate was added to the mineral oil and dissolved therein. Thereafter 10.5 grams of aluminum tridecylate were slowly added to the reaction zone over a 70-minute period. The reaction zone was maintained at about 130°–140° C. The reaction zone contents became increasingly viscous during the reaction period and about 5 minutes after the last addition of the aluminum tridecylate the entire contents formed a gel.

Example 4

To a one-liter flask was added 500 milliliters mixed xylenes and 21 grams powdered aluminum isopropoxide. The flask was heated to 140° C. and thereafter a copolymer of ethylene and vinyl acetate containing 28 weight percent vinyl acetate was slowly added to the reaction zone. During the reaction a distillate was removed from the reaction zone at a boiling point of about 125°–130° C. After the addition of about 16 grams of the polymer over a 30-minute period, the reactant became very viscous and began to form a gel. The distillate was obtained at a temperature of about 72°–100° C. Analysis of the distillate showed it to comprise a mixture of 35–40 percent isopropyl acetate in xylene.

Example 5

The rubber mill was heated to 149° C. and 100 grams of a copolymer of ethylene and vinyl acetate containing 40 weight percent vinyl acetate was distributed on the rollers. Thereafter two grams aluminum (sec-butoxide) was added to the polymer and the mixture milled for 5 minutes at 149° C. The resultant material was rubbery and scraped off of the heated rolls and stored as sample No. 1. The experiment was repeated with the addition of 100 grams of the polymer to the heated rolls at 149° C. and 2 grams thio-beta-naphthol was then added and mixed therein for 5 minutes. Thereafter 2 grams of the aluminum (sec-butoxide) was added and the mixture milled for 5 minutes at 149° C. Upon completion of this period the resultant polymer was removed from the heated rolls. Samples of each of the polymers together with a sample of the untreated polymer were tested for solvent resistance by placing 5 grams of each of the materials in 50 milliliters toluene and placing the solutions on a steam bath with occasional stirring. After 10 minutes the untreated polymer was completely dissolved in the toluene; however, after ½ hour samples #1 and #2 of the milled polymer were still undissolved. The liquids were decanted and the gel dried to recover 3.73 and 3.53 grams, respectively, of the first and second treated polymers. The preceding example evidences that the presence of the mercaptan did not prevent crosslinking or substantially reduce the degree of this crosslinking. Since mercaptans are known free radical inhibitors, it is apparent that the crosslinking achieved in accordance with this invention does not proceed by a free radical mechanism.

Example 6

To demonstrate the mechanism of the reaction the following experiment was performed. Into 250 milliliters toluene was added 10 grams polyvinyl acetate and 5 grams aluminum chelate PEA-2, which is a chelate of aluminum isopropoxide and two moles of ethyl aceto acetate. The mixture was heated for 15 minutes at reflux temperature; however, no increase in viscosity or gelation occurred. Since the ethyl aceto acetate is bonded to aluminum by an oxy group and by the chelate bonding of its carbonyl group, it would not be expected to be displaced by the acetyl group on the polymer and no transesterification would be expected. The failure of any gelation to occur thus evidences that the crosslinking requires at least two displaceable alkoxy groups on the aluminum and is accomplished with the formation of alkoxy links between the polymer and the aluminum and not by a free radical mechanism. When the experiment was repeated using PEA-1, a chelate of aluminum isopropoxide and only one mol of ethyl aceto acetate, crosslinking occurred and a gel was obtained.

Example 7

The rubber mill was heated to 149° C. and 100 grams polyvinyl acetate was distributed on the rollers. Thereafter 4 grams ethyl silicate was slowly added to the polymer and the mixture milled for 10 minutes. The polymer was removed and a portion molded into a disc which was rigid at 25° C. and had a softening point of 40° C.

Example 8

Into 250 milliliters of toluene at reflux temperature was added 20 grams polyvinyl acetate and 1 gram titanium tetrabutoxide. Within 2 minutes a clear gel had formed. The toluene was removed from the gel by heating the gel in a flask with a steam bath while applying a vacuum of 5 millimeters mercury pressure. A rubbery solid was obtained as the product, evidencing the crosslinking of the polymer.

The preceding examples are intended solely to illustrate the practice of my invention. It is not intended that the invention be unduly restricted by these examples since it is readily apparent to those skilled in the art that any of the aforementioned polyvalent metal alkoxides can be directly substituted for the metal alkoxides actually used in the examples and comparable results thereby obtained. In a similar fashion, other inert and common solvents and other polymers and copolymers set forth in the description of the invention can readily be substituted for those actually used in the examples. It is intended, therefore, that my invention be defined by the method steps and their equivalents set forth in the following claims.

I claim:
1. The method for crosslinking polymers of ester monomers of a saturated aliphatic acid and an ethylenically unsaturated alcohol that comprises:
   heating said polymer to a temperature from about 75° to 225° C., sufficient to soften said polymer but insufficient to sever carbon-to-carbon bonds;
   adding to said polymer from 0.5 to about 5.0 weight percent to a polyvalent metal alkoxide of the following structure:

$$M(OR)_n$$

wherein:
   M is a polyvalent metal selected from Groups II, III, IV, V, VII and the iron subgroup;
   R is an alkyl group having from 1 to about 20 carbons; and
   n is a whole number of 2 to 5; and thoroughly blending said alkoxide in said polymer under said conditions to cause transesterification and crosslink said polymer with metal alkoxy linkages and liberate a by-product ester formed from said OR group and the acyloxy group of said saturated aliphatic acid.
2. The method of claim 1 wherein said blending is performed at a temperature sufficient to vaporize the by-product ester.
3. The method of claim 1 wherein the polymer is polyvinyl acetate.
4. The method of claim 1 wherein the polymer is a copolymer of vinyl acetate and an alkene.
5. The method of claim wherein said metal alkoxide is aluminum alkoxide having alkoxide groups containing from 1 to about 5 carbons.
6. The method of claim 1 wherein said metal alkoxide is an aluminum 2-ethyl hexoxide, triisopropoxide, tridecylate, or sec-butoxide or titanium tetrabutoxide.
7. The method of claim 5 wherein said polymer is a copolymer of vinyl acetate and ethylene.

References Cited

UNITED STATES PATENTS

| 3,277,157 | 10/1966 | Steeart et al. | 260—486 |
| 3,317,483 | 5/1967 | Verdol | 260—78.4 |
| 3,369,003 | 2/1968 | Verdol | 260—78.5 |
| 3,404,134 | 10/1968 | Rees | 260—78.5 |
| 3,219,604 | 11/1965 | Fischer | 260—22 |
| 3,361,845 | 1/1968 | Watanabe et al. | 260—865 |
| 3,350,475 | 10/1967 | Watanabe et al. | 260—865 |
| 3,175,996 | 3/1965 | Gregorian et al. | 260—63 |
| 2,892,780 | 6/1959 | Rinse | 260—75 |
| 2,680,108 | 6/1954 | Schmidt | 260—75 |

OTHER REFERENCES

Noller, Chemistry or Organic Compounds, p. 88. W. B. Saunders, Philadelphia (1951).

JOSEPH L. SCHOFER, Primary Examiner

J. C. HAIGHT, Assistant Examiner

U.S. Cl. X.R.

260—85.7, 89.1